(12) United States Patent
Miller, III

(10) Patent No.: US 6,790,359 B2
(45) Date of Patent: Sep. 14, 2004

(54) VERTICAL PHASE SEPARATION IN ANAEROBIC DIGESTION

(76) Inventor: Herman P. Miller, III, P.O. Box 1769, Stockton, CA (US) 95201-1769

(*) Notice: Subject to any disclaimer, the term of this patent is extended or adjusted under 35 U.S.C. 154(b) by 144 days.

(21) Appl. No.: 10/225,310

(22) Filed: Aug. 21, 2002

(65) Prior Publication Data

US 2003/0038079 A1 Feb. 27, 2003

Related U.S. Application Data

(60) Provisional application No. 60/313,858, filed on Aug. 21, 2001.

(51) Int. Cl.[7] .................................................. C02F 3/28
(52) U.S. Cl. .................... 210/603; 210/631; 210/194; 210/197; 210/199; 210/512.1
(58) Field of Search ................. 210/603, 604, 210/615–618, 629, 631, 181, 194, 197, 199, 205, 218, 220, 260, 416.1, 512.1, 535

(56) References Cited

U.S. PATENT DOCUMENTS

| | | | | |
|---|---|---|---|---|
| 2,772,233 A | * | 11/1956 | Nelson | 210/608 |
| 3,788,472 A | * | 1/1974 | Boschen et al. | 210/103 |
| 4,146,359 A | * | 3/1979 | Lumpkin et al. | 432/14 |
| 4,668,391 A | * | 5/1987 | Ottens | 210/181 |
| 5,240,599 A | * | 8/1993 | Kew et al. | 210/173 |
| 5,587,079 A | * | 12/1996 | Rowley et al. | 210/603 |
| 5,618,411 A | * | 4/1997 | Donner et al. | 210/150 |
| 5,824,222 A | * | 10/1998 | Keyser et al. | 210/607 |
| 6,086,765 A | * | 7/2000 | Edwards | 210/605 |
| 6,346,412 B1 | * | 2/2002 | Stormo | 435/262 |

FOREIGN PATENT DOCUMENTS

RU          2051127       * 12/1995

* cited by examiner

Primary Examiner—Fred G. Prince

(57) ABSTRACT

Method and process for dramatically increasing mixing, energy and operating efficiency of wastewater treatment plants at reduced capital and operating cost per unit volume.

28 Claims, 2 Drawing Sheets

VERTICAL PHASE SEPARATION IN ANAEROBIC DIGESTION

RELATED APPLICATION

This application claims priority under 35 USC 119(c) to Provisional Application No. 60/313,858, filed Aug. 21, 2001.

BACKGROUND OF THE INVENTION

1. Field of Invention

This invention pertains generally to anaerobic digestion and, more particularly, to an anaerobic digestion system and method in which the pH control, mixing, and blending of the biological phases of the anaerobic process in the digestion of biosolid feedstock is accomplished in a single tank or vessel utilizing vertical phase separation, thus eliminating the necessity of separate or additional tanks to provide and/or maintain these functions.

2. Related Art

Anaerobic digestion of biosolids for the reduction of liquid or liquefied wastes such as sewage, garbage, agricultural, and industrial bi-products into energy in the form of methane or natural gas, carbon dioxide, sulfur compounds, and sludge that is useful for fuel or fertilizer, is a multi-phase or stage process. Generally speaking there are two recognized principal phases or types of anaerobic bacteria commonly known as the acid formers and the methane fermenters. In addition there are a number of minor phases or biochemical reactions that take place in the transition between these two major phases, designated herein simply as the transitional phase. There is ample evidence today that some separation of these phases contributes to the digestion efficiency overall, Dague & Kaiser U.S. Pat. No. 5,525,228, and it may be found advantageous to separate any number of these phases, Steiner U.S. Pat. No. 5,630,942.

However, historically and until relatively recent time anaerobic digestion took place in a single tank or vessel. Noted improvement in the anaerobic process has been demonstrated by separating the phases of digestion by using 2 to 4 tanks connected in series. Mixing of the liquor has been on a tank-wise basis in such a manner that the operation of each of the biochemical phases was completely intermixed in a single tank, and phase separation was accomplished by the use of multiple tanks. There are practitioners who believe that the total separation of the major phases is most efficient while other practitioners believe that a certain amount of feedback and blending is necessary in order to maintain the maximum bacterial growth rate and process stability. This process provides the ultimate flexibility to operate in either of these modes as well as any combination of the two. The varying conditions encountered in the anaerobic process during start-up, up-set, recovery, and normal variances in the constitution of the bio-feedstock dictate that the operation of such processes must have the ability to constantly separate, monitor and control the pH, feedback, temperature, and mixing of the liquor in the various phases of the digestion process. The invention described herein provides all of these features in the enclosure of a single tank or vessel.

OBJECTS AND SUMMARY OF THE INVENTION

It is in general an object of the invention to provide an new and improved anaerobic digestion system and method.

Another object of the invention is to provide an anaerobic digestion system and method of the above character which overcomes the limitations and disadvantages of systems and methods heretofore provided.

These and other objects are achieved in accordance with the invention by providing an anaerobic digestion system and method in which the pH control, mixing, and blending of the biological phases of the anaerobic process in the digestion of biosolid feedstock is accomplished in a single tank or vessel utilizing vertical phase separation, thus eliminating the necessity of separate or additional tanks to provide and/or maintain these functions. The invention also provides the ability to control the pH of the liquor in each phase by a hydro mechanical means, while at the same time providing a mixing of the liquor within each phase and allows for feedback and blending of the liquor as may be required for optimum performance.

DETAILED DESCRIPTION

Figure 1:
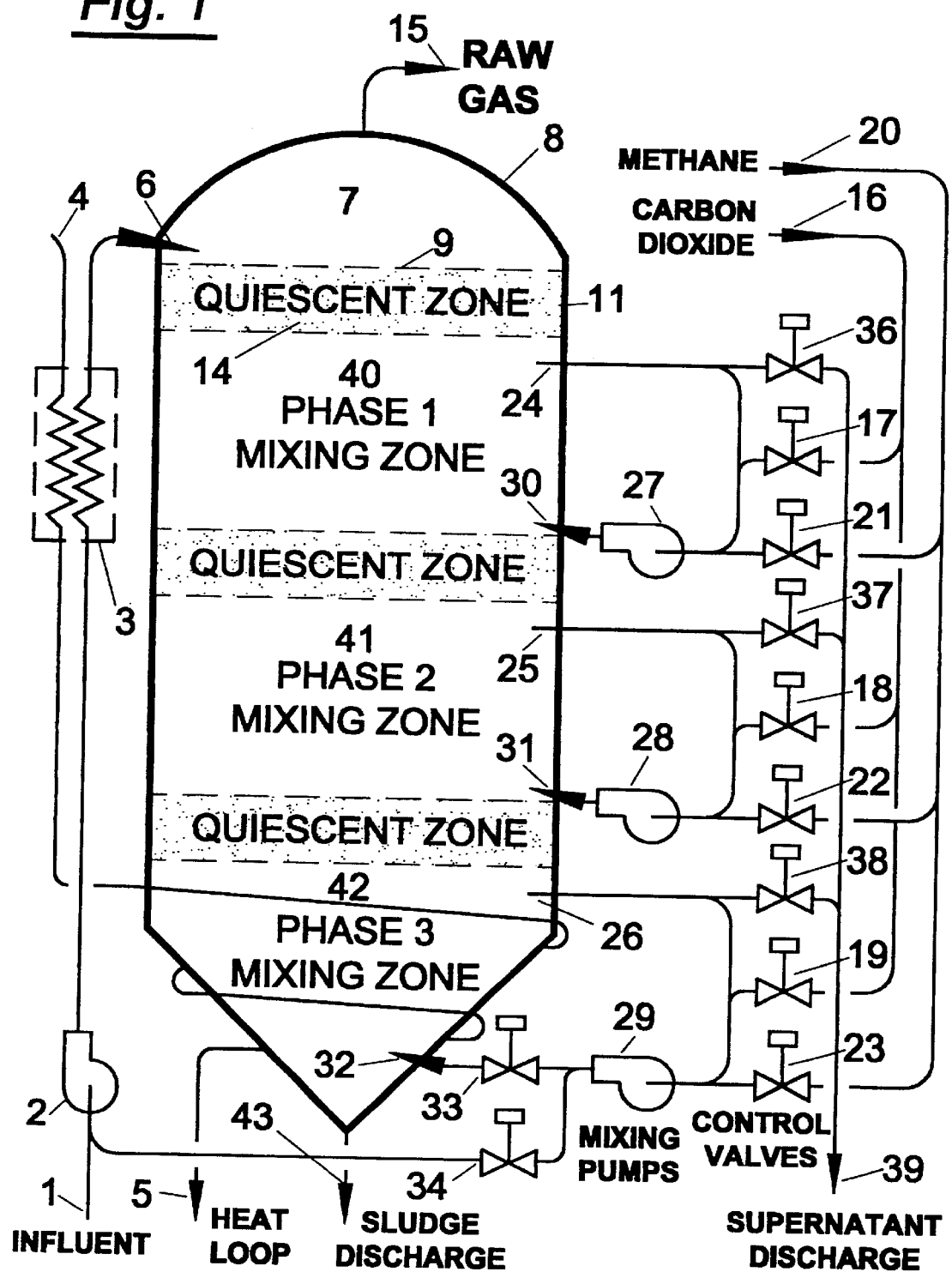
FIG. 1 depicts in schematic form the preferred embodiment of the invention, showing one form of a digester tank, with a three phase version of the several possible digestion schemes, one version of an optional fixed or floating media scheme, one version of a horizontal mixing scheme using uplift reverse cyclonic horizontal mixing, a diffusion gas or chemical mixing pump scheme, a feedback loop, the preferred embodiment of the many styles of digester heating apparatus, major piping lines and control valves, influent pumping, and effluent ports.
Figure 2A:
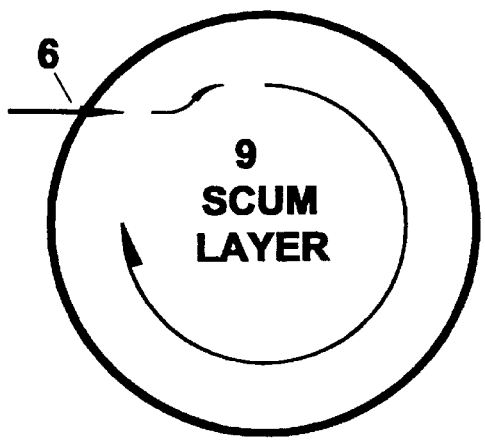
FIGS. 2A–2d depicts in vertical view, either upward or downward, a flow arrangement for the preferred upward reverse cyclonic horizontal mixing embodiment of this invention with a provision for a quiescent zone for greater bacterial colonization and growth that may be controlled and varied to meet the demands of the biosolid supply, with mixing lines numbered in correlation with those of FIG. 1 for a vertical top view mixing scheme.
Figure 2B:
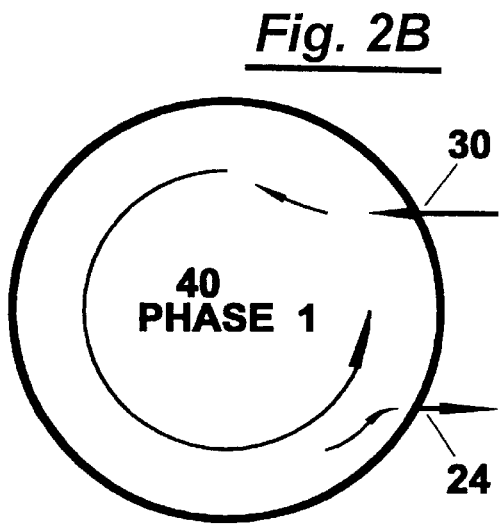
Figure 2C:
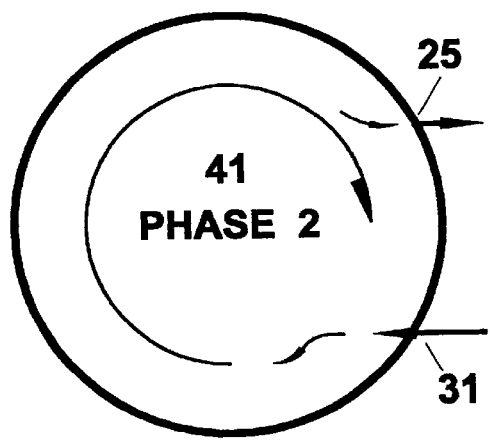
Figure 2D:
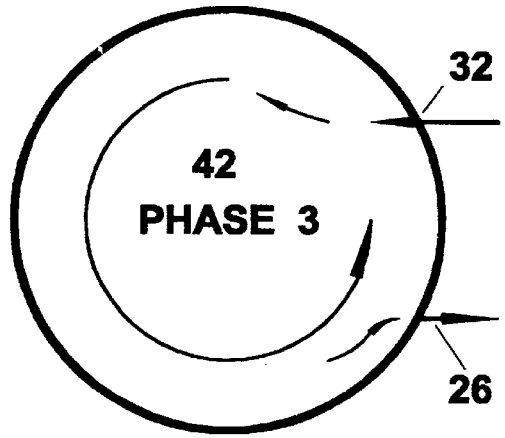

In the preferred embodiment of the invention as shown in FIG. 1 the liquefied biosolid influent enters the system at 1, where it is pumped 2, through heat exchanger 3, which is supplied by heat loop 4 to 5, and is discharged through nozzle 6 in the dome 7 of digester 8 into scum layer 9, creating the cyclonic mixing and breakup of that layer, as shown in FIG. 2A. The biosolids settle into quiescent bacterial colonization zone 11, created by the reverse cyclonic action at the top of mixing zone 40 (Phase 1, and aided by the optional fixed or floating bacterial residence media 14 in the quiescent zone. In the preferred embodiment, a multi-faceted floating media is employed in order to maximize the bacterial residence area. That media floats in colonization quiescent zone 11 and is restrained into position by plastic screen or netting.

In the embodiment illustrated, digester 8 is a three phase system in which the digester tank is divided into three vertically separated mixing zones 40–42 beneath quiescent zone 11, with different phases of a digestion process (Phases 1–3) being carried out in respective ones of the mixing zones. As best seen in FIGS. 2A–2D, the liquid rotates in opposite directions in adjacent ones of the mixing zones, and the counter rotating liquid produces quiescent zones 46, 47 between the mixing zones. Bacterial residence media similar to media 14 can be provided in quiescent zones 46, 47, and retained there by plastic screen or netting 44 and 46.

The primary biochemical action in quiescent zone 11 and mixing zones 40 (Phase) is the conversion of biomass into carbon dioxide gas and water. The carbon dioxide gas bubbles up through the liquor aiding in the mixing and is collected in dome 7, to be eventually drawn off at the raw gas outlet 15, where it may be separated from the raw gas, bottled for sale, and/or used as a pH control substance and mixing enhancement through line 16 and control valves 17,18, and 19. In the preferred embodiment raw gas separation, Miller U.S. Pat. No. 6,291,232 is used to separate the two major gas products methane and carbon dioxide for pH control, otherwise other chemical feed may be substituted at line 16.

Similarly, in the preferred embodiment raw gas separation permits a certain amount of methane gas to be injected at 20, in lieu of a base chemical. The use of methane gas in mixing greatly enhances the action of methane fermentation to the point that basic chemicals are not required in the pH control process. Methane injected at 20 is fed into the process through control valves 21, 22, and 23 where it not only controls the pH and stability of the process but markedly improves mixing. Liquor drawn off at zone outlets 24, 25 and 26 is circulated by diffusion pumps 27, 28, and 29 through uplift nozzles 30, 31, and 32, resulting in the flow patterns shown in FIGS. 2a–2D.

In addition to mixing the liquor within each phase, the invention also allows for feedback and blending of the liquor between the phases. In that regard, it will be noted that valves 21–23, and 33–34 provide the possibility of a bacteria feedback loop which permits liquor from one phase to be fed back to and blended with the liquid in other phases of the process. Similarly, liquor from desired ones of the mixing zones can be fed back to the influent stream 1 and blended further with the liquor in the different phases.

Control valves 36, 37, and 38 permit sampling of the phases and emergency drains in the preferred embodiment which incorporates Vacuum Retort Anaerobic Digestion, Miller U.S. Pat. No. 6,291,232, in which water is evaporated off the digester and influent at dome 7, and drawn off through outlet 15 as the major component of the raw gas vapor. In the non-preferred embodiments supernatant liquor is drawn off through valves 36, 37, and 38 and outlet 39.

As the biosolid influent gradually works its way down through mixing zones 40 (Phase 1), 41 (Phase 2), and 44 (Phase 3), and quiescent zones 46, 47, it is slowly transformed into carbon dioxide gas, methane gas and a small amount of hydrogen sulfide gas and a fairly inert sludge that has released the greatest part of its water and in the preferred embodiment is completely pasteurized before being drawn off at outlet 43.

The method can be summarized as comprising the steps of introducing a liquefied biosolid influent into an upper portion of a digester tank to produce cyclonic mixing and breakup of the influent in a first mixing zone 40 within the tank, creating a first quiescent zone 46 of counter rotating liquid beneath the first mixing zone, producing further cyclonic mixing in a second mixing zone 41 beneath the first quiescent zone creating a second quiescent zone 47 of counter rotating liquid beneath the second mixing zone, and producing still further cyclonic mixing in a third mixing zone 42 beneath the second quiescent zone.

What is claimed is:

1. In an anaerobic digestion system: a digester tank, a plurality of vertically separated mixing zones within the tank, with different phases of a digestion process being carried out in different ones of the mixing zones, and a quiescent zone between successive ones of the mixing zones.

2. The system of claim 1 including means for causing liquid to rotate in opposite directions in successive ones of the mixing zones, with the quiescent zone being formed between the counter rotating liquid in the mixing zones.

3. The system of claim 1 including means for withdrawing a liquor from each of the mixing zones and returning the liquor to the zone from which it is withdrawn in order to mix the liquor in the zone.

4. The system of claim 1 including means for collecting effluent gas from the digester tank and introducing the effluent gas back into the mixing zones to control the pH of a liquor in the mixing zones.

5. The system of claim 1 including means for blending a liquor from one of the mixing zones with the liquor in another one of the mixing zones.

6. In an anaerobic digestion system: a digester tank, means for introducing a liquefied biosolid influent into an upper portion of the digester tank to produce cyclonic mixing and breakup of the influent in a first mixing zone within the tank, means for creating a first quiescent zone of counter rotating liquid beneath the first mixing zone, means for producing further cyclonic mixing in a second mixing zone beneath the first quiescent zone, means for creating a second quiescent zone of counter rotating liquid beneath the second mixing zone, and means for producing still further cyclonic mixing in a third mixing zone beneath the second quiescent zone.

7. The system of claim 6 including means for controlling the pH of a liquor in each of the mixing zones.

8. The system of claim 6 including means for blending a liquor from one of the mixing zones with the liquor in another one of the mixing zones.

9. The system of claim 6 wherein the means for producing cyclonic mixing in each of the mixing zones includes a separate mixing pump connected to the tank in each of the mixing zones.

10. The system of claim 9 including means for injecting gases into the mixing zones through the pumps to control pH within the mixing zones.

11. The system of claim 9 including means for injecting carbon dioxide gas into the mixing zones through the pumps.

12. The system of claim 9 including means for injecting methane gas into the mixing zones through the pumps.

13. The system of claim 6 including means for recirculating liquor from from one portion of the mixing zones to another.

14. In an anaerobic digestion method, the steps of: creating a plurality of vertically separated mixing zones within a digester tank, forming a quiescent zone between successive ones of the mixing zones, and carrying out different phases of a digestion process in different ones of the mixing zones.

15. The method of claim 14 wherein a liquid is rotated in opposite directions in successive ones of the mixing zones, and the quiescent zone is formed between the counter rotating liquid in the mixing zones.

16. The method of claim 14 including the steps of withdrawing a liquor from each of the mixing zones and returning the liquor to the zone from which it is withdrawn in order to mix the liquor in the zone.

17. The method of claim 14 including the steps of collecting effluent gas from the digester tank and introducing the effluent gas back into the mixing zones to control the pH of a liquor in each of the mixing zones.

18. The method of claim 14 including the step of blending a liquor from one of the mixing zones with the liquor in another one of the mixing zones.

19. The method of claim 14 including the step of blending a liquor from one of the mixing zones with the liquor in another one of the mixing zones.

20. In an anaerobic digestion method, the steps of: introducing a liquefied biosolid influent into an upper portion of a digester tank to produce cyclonic mixing and breakup of the influent in a first mixing zone within the tank, creating a first quiescent zone of counter rotating liquid beneath the first mixing zone, producing further cyclonic mixing in a second mixing zone beneath the first quiescent zone, creating a second quiescent zone of counter rotating liquid beneath the second mixing zone, and producing still further cyclonic mixing in a third mixing zone beneath the second quiescent zone.

21. The method of claim 20 including the step of controlling the pH of a liquor in each of the mixing zones.

22. The method of claim 20 wherein the steps of producing cyclonic mixing in each of the mixing zones include pumping liquid into each of the mixing zones through a separate mixing pump connected to the tank in each of the mixing zones.

23. The method of claim 22 including the step of injecting gases into the mixing zones to control pH within the mixing zones.

24. The method of claim 22 including the step of injecting carbon dioxide gas into the mixing zones.

25. The method of claim 22 including the step of injecting methane gas into the mixing zones.

26. The method of claim 20 including the step of recirculating liquor from from one portions of the mixing zones to another.

27. An anaerobic digestion system, comprising: a digester tank having a plurality of vertically separated mixing zones, means for introducing a liquefied biosolid influent into an upper portion of the digester tank so that it can work its way down through the mixing zones, means for causing the liquid to rotate in a first direction in a first one of the mixing zones, means for causing liquid to rotate in an opposite direction in a second one of the mixing zones, with a quiescent zone being formed between and separating the first and second mixing zones, and means for causing liquid to rotate in the first direction in a third one of the mixing zones, with another quiescent zone being formed between and separating the second and third mixing zones.

28. An anaerobic digestion process, comprising the steps of: introducing a liquefied biosolid influent into an upper portion of a digester tank, allowing the liquefied influent to work its way down through a plurality of vertically separated mixing zones in the tank, rotating the liquid in a first direction in a first one of the mixing zones, rotating the liquid in an opposite direction in a second one of the mixing zones, with a quiescent zone forming between and separating the counter rotating liquid in the first and second mixing zones, and rotating the liquid in the first direction in a third one of the mixing zones, with another quiescent zone forming between and separating the counter rotating liquid in the second and third mixing zones.

* * * * *